(12) United States Patent     (10) Patent No.:    US 12,656,209 B2

Ono                        (45) Date of Patent:      Jun. 16, 2026

(54) LIQUID LEAK DETECTION DEVICE, LIQUID LEAK DETECTION SYSTEM, AND LIQUID LEAK DETECTION METHOD

(71) Applicant: NEC Corporation, Tokyo (JP)

(72) Inventor: Takahiro Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 402 days.

(21) Appl. No.: 18/272,738

(22) PCT Filed: Jan. 22, 2021

(86) PCT No.: PCT/JP2021/002224
§ 371 (c)(1),
(2) Date: Jul. 17, 2023

(87) PCT Pub. No.: WO2022/157923
PCT Pub. Date: Jul. 28, 2022

(65) Prior Publication Data

US 2024/0302244 A1     Sep. 12, 2024

(51) Int. Cl.
*G01M 3/38*       (2006.01)

(52) U.S. Cl.
CPC ..................................... *G01M 3/38* (2013.01)

(58) Field of Classification Search
CPC ....................................................... G01M 3/38
See application file for complete search history.

(56) References Cited

U.S. PATENT DOCUMENTS

| | | | | |
|---|---|---|---|---|
| 4,749,855 A | * | 6/1988 | Watanabe | ............... G01M 3/04 |
| | | | | 250/225 |
| 6,184,979 B1 | * | 2/2001 | Hirano | ................. G01C 15/002 |
| | | | | 356/138 |
| 8,451,398 B2 | * | 5/2013 | Mizuuchi | .......... G02F 1/133621 |
| | | | | 349/61 |
| 2017/0115396 A1 | | 4/2017 | Uehara | |
| 2018/0321385 A1 | * | 11/2018 | Embry | ................... G01K 13/02 |

(Continued)

FOREIGN PATENT DOCUMENTS

| | | | | | |
|---|---|---|---|---|---|
| CN | 102317873 A | * | 1/2012 | ........... | G03H 1/2249 |
| JP | S62-197745 A | | 9/1987 | | |

(Continued)

OTHER PUBLICATIONS

Distributed fiber optic vibration sensor based on polarization fading model for gas pipeline leakage testing experiment, Qiang Wang, p. 468-476 (Year: 2018).*

(Continued)

*Primary Examiner* — Tung S Lau
(74) *Attorney, Agent, or Firm* — Sughrue Mion, PLLC

(57)        ABSTRACT

The purpose of the present invention is to detect a liquid leak in a pipe more easily. This liquid leak detection device (2) comprises: a data acquiring means (11) that acquires data based on reflected light from laser light which irradiates a region including a pipe; a pipe model generating means (12) that uses the data and generates a pipe model that is a three-dimensional model of the pipe; a polarization state detecting means (13) that uses the data and detects a polarization state in the pipe model; and a liquid leak detecting means (14) that detects a liquid leak in the pipe on the basis of the polarization state detected by the polariza-tion state detecting means.

18 Claims, 11 Drawing Sheets

(56)             References Cited

U.S. PATENT DOCUMENTS

| | | |
|---|---|---|
| 2020/0116864 A1 | 4/2020 | Peterseim et al. |
| 2020/0386892 A1 | 12/2020 | Kotov et al. |

FOREIGN PATENT DOCUMENTS

| | | | |
|---|---|---|---|
| JP | S62-197747 A | 9/1987 | |
| JP | 2002-286862 A | 10/2002 | |
| JP | 2011-185757 A | 9/2011 | |
| JP | 2014-174708 A | 9/2014 | |
| JP | 2020-515873 A | 5/2020 | |
| JP | 2020-537146 A | 12/2020 | |
| WO | WO 0185386 A2 * | 11/2001 | .............. B22F 12/57 |

OTHER PUBLICATIONS

Pipe Inspection Using a Laser-Based Transducer and Automated Analysis Techniques, Olga Duran, IEEE/ASME Transactions on Mechatronics, vol. 8, No. 3, Sep. 2003, pp. 401-409 (Year: 2003).*
International Search Report for PCT Application No. PCT/JP2021/002224, mailed on Mar. 16, 2021.
English translation of Written opinion for PCT Application No. PCT/JP2021/002224, mailed on Mar. 16, 2021.

* cited by examiner

Fig.2C

LIQUID LEAK DETECTION DEVICE, LIQUID LEAK DETECTION SYSTEM, AND LIQUID LEAK DETECTION METHOD

This application is a National Stage Entry of PCT/JP2021/002224 filed on Jan. 22, 2021, the contents of all of which are incorporated herein by reference, in their entirety.

TECHNICAL FIELD

The present invention relates to a liquid leak detection device and the like.

BACKGROUND ART

Heretofore, in a facility having a pipe, an operator detects a liquid leak in the pipe by hand work and direct visual inspection. Specifically, for example, in a factory, an operator detects an oil leak in a pipe by hand work and direct visual inspection.

PTL 1 discloses a technique for detecting an oil leak in a pipe by using a visible light camera. More specifically, a technique for detecting a leak of oil that emits fluorescence by irradiation of light is disclosed (for example, refer to the abstract of PTL 1). Specifically, a light irradiation means applies light to a region including the pipe. The visible light camera captures an image of the region in a state in which the region is irradiated with the light, and in addition, captures an image of the region in a state in which the region is not irradiated with the light. A difference image between the images thus acquired by capturing the images is acquired. Based on a change of brightness in the difference image thus acquired, it is determined whether there is an oil leak.

As a related art, a technique described in PTL 2 is also known. A technique described in PTL 3 is also known.

CITATION LIST

Patent Literature

PTL 1: Japanese Unexamined Patent Application Publication No. 2011-185757
PTL 2: Japanese Unexamined Patent Application Publication No. S62-197745
PTL 3: Japanese Unexamined Patent Application Publication No. 2002-286862

SUMMARY OF INVENTION

Technical Problem

In the technique described in PTL 1, at a time of detecting an oil leak in the pipe, work for installing the visible light camera and work for installing the light irradiation means are required. Further, in the technique described in PTL 1, control for synchronizing a timing when the light is applied by the light irradiation means and a timing when the image is captured by the visible light camera with each other is required. As described above, in the technique described in PTL 1, there is a problem that a configuration for detecting the oil leak is complicated.

The present invention has been made in order to solve the problem as described above, and an object of the present invention is to detect a liquid leak in a pipe more easily.

Solution to Problem

One aspect of a liquid leak detection device according to the present invention includes: a data acquiring means for acquiring data based on reflected light of laser light applied to a region including a pipe; a pipe model generating means for generating a pipe model being a three-dimensional model of the pipe by using the data; a polarization state detecting means for detecting a polarization state in the pipe model by using the data; and a liquid leak detecting means for detecting a liquid leak in the pipe, based on the polarization state detected by the polarization state detecting means.

One aspect of a liquid leak detection method according to the present invention includes: acquiring, by a data acquiring means, data based on reflected light of laser light applied to a region including a pipe; generating, by a pipe model generating means, a pipe model being a three-dimensional model of the pipe by using the data; detecting, by a polarization state detecting means, a polarization state in the pipe model by using the data; and detecting, by a liquid leak detecting means, a liquid leak in the pipe, based on the polarization state detected by the polarization state detecting means.

One aspect of a recording medium according to the present invention records a program for causing a computer to function as: a data acquiring means for acquiring data based on reflected light of laser light applied to a region including a pipe; a pipe model generating means for generating a pipe model being a three-dimensional model of the pipe by using the data; a polarization state detecting means for detecting a polarization state in the pipe model by using the data; and a liquid leak detecting means for detecting a liquid leak in the pipe, based on the polarization state detected by the polarization state detecting means.

Advantageous Effects of Invention

According to the present invention, a liquid leak in a pipe can be detected more easily.

BRIEF DESCRIPTION OF DRAWINGS

FIG. 2C is a block diagram illustrating another hardware configuration of the main portion of the liquid leak detection device according to the first example embodiment.

EXAMPLE EMBODIMENT

Hereinafter, example embodiments of the present invention will be described with reference to the drawings.

First Example Embodiment

Figure 1:
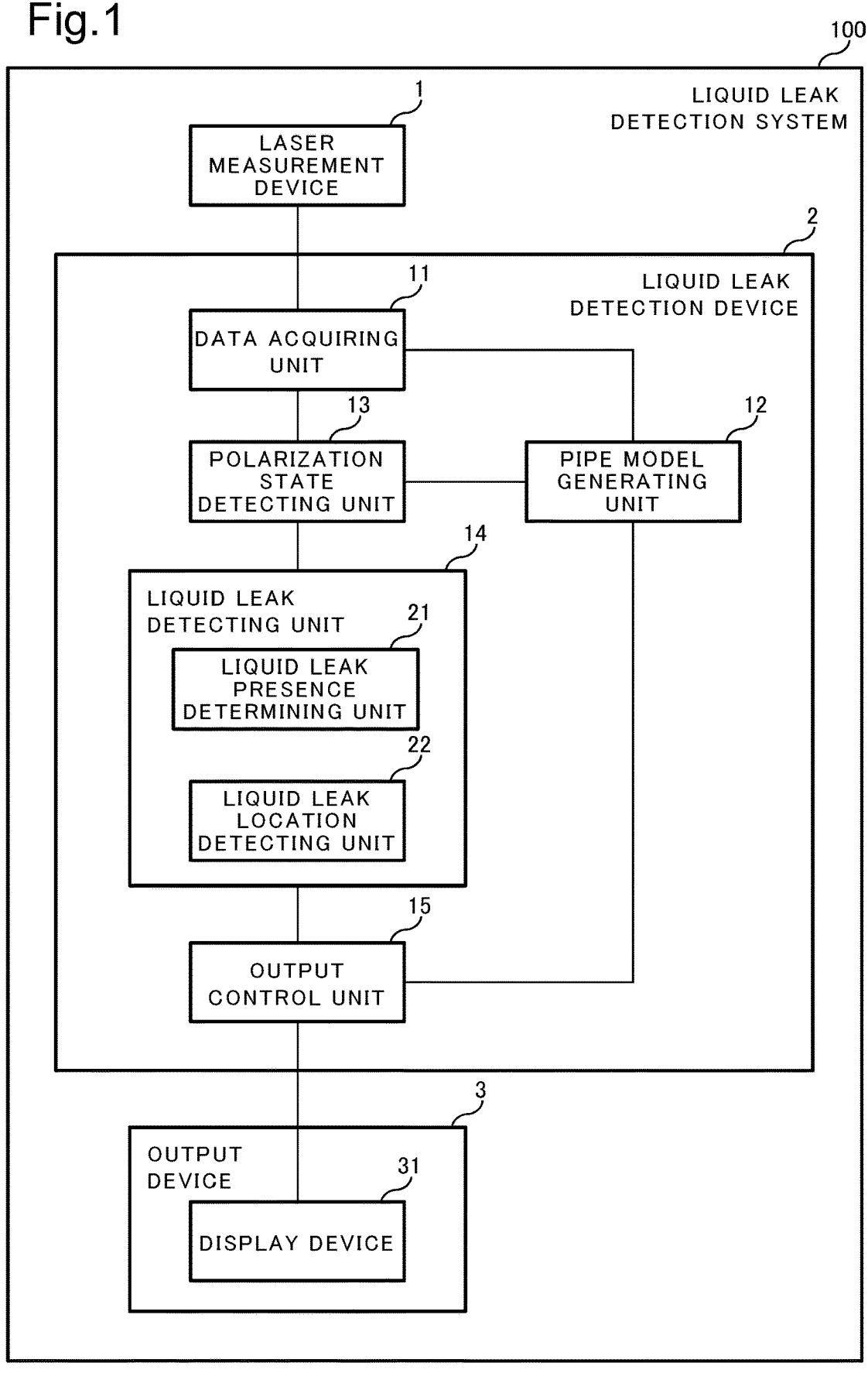
FIG. 1 is a block diagram illustrating a main portion of a liquid leak detection system including a liquid leak detection device according to a first example embodiment.

FIG. 1 is a block diagram illustrating a main portion of a liquid leak detection system including a liquid leak detection device according to a first example embodiment. Referring to FIG. 1, a description will be given of the liquid leak detection system including the liquid leak detection device according to the first example embodiment.

As illustrated in FIG. 1, a liquid leak detection system 100 includes a laser measurement device 1, a liquid leak detection device 2 and an output device 3. The liquid leak detection device 2 includes a data acquiring unit 11, a pipe model generating unit 12, a polarization state detecting unit 13, a liquid leak detecting unit 14 and an output control unit 15. The liquid leak detecting unit 14 includes a liquid leak presence determining unit 21 and a liquid leak location detecting unit 22. The output device 3 includes a display device 31.

The laser measurement device 1 is installed in a facility (for example, a factory) having at least one pipe P. A region to be measured by the laser measurement device 1 (hereinafter referred to as a "measurement target region") includes at least a part of the pipe P.

That is, the laser measurement device 1 emits laser light L_I. The laser light L_I is applied to the measurement target region. The laser light L_I thus applied is reflected by an object in the measurement target region. The laser measurement device 1 receives laser light L_R thus reflected. Hereinafter, the laser light L_I applied to the measurement target region may be referred to as "applied laser light" or simply as "laser light". Further, the laser light L_R reflected by the object in the measurement target region may be referred to as "reflected laser light" or "reflected light".

Herein, the object that reflects the applied laser light L_I includes a portion of the pipe P, which is included in the measurement target region. Further, when there is a liquid leak (for example, an oil leak) in such a portion, the object that reflects the applied laser light L_I includes such a liquid (for example, oil).

The laser measurement device 1 executes measurement by using Light Detection and Ranging (LiDAR), based on the applied laser light L_I and the reflected laser light L_R. The laser measurement device 1 outputs data (hereinafter referred to as "measured data") indicating a result of such measurement.

That is, in the laser measurement device 1, an emission direction of the applied laser light L_I is variable. The laser measurement device 1 sequentially emits the applied laser light L_I in a plurality of directions. Thus, the applied laser light L_I is emitted in each of the plurality of directions. Regarding the emission of the applied laser light L_I in each direction, by the laser measurement device 1, generated are data (hereinafter referred to as "distance data") indicating a one-way propagation distance associated with a round-trip propagation time of the laser light L_I, L_R and data (hereinafter referred to as "direction data") indicating the emission direction of the applied laser light L_I. In addition, data (hereinafter referred to as "position data") indicating a position of the laser measurement device 1 is generated when the laser measurement device 1 is of a mobile type or of a portable type. The measured data output by the laser measurement device 1 includes these data (that is, the distance data, the direction data and the position data).

Further, the laser measurement device 1 splits the reflected laser light L_R into two polarization components (including an X-polarization component and a Y-polarization component) by using a polarization splitter (not illustrated). The laser measurement device 1 executes coherent detection for each of the X-polarization component and the Y-polarization component by using a coherent detector (not illustrated). In addition to outputting the measured data, the laser measurement device 1 outputs data (hereinafter referred to as "detected data") indicating a result of such coherent detection. Herein, the X-polarization component and the Y-polarization component indicate orthogonal components decomposed on a plane orthogonal to a travel direction of light. Specifically, for example, the X-polarization component and the Y-polarization component indicate these orthogonal components in P-polarized light.

Note that, a variety of well-known technologies can be used for the measurement using the LiDAR. Further, a variety of well-known technologies can be used for the coherent detection. Detailed descriptions of these technologies will be omitted.

The laser measurement device 1 may be of a mobile type or of a portable type. The laser measurement device 1 moves, and thereby the measurement target region can be substantially expanded. Thus, a range of the pipe P, which is included in the measurement target region, can be expanded. As a result, for example, the whole of the pipe P can be included in the measurement target region.

The data acquiring unit 11 acquires the measured data and the detected data, which are output by the laser measurement device 1.

By using the measured data acquired by the data acquiring unit 11, the pipe model generating unit 12 generates a three-dimensional model (hereinafter referred to as a "pipe model") PM associated with a surface shape of the portion of the pipe P, which is included in the measurement target region. That is, by using the distance data and the direction data, which are included in the acquired measured data, the pipe model generating unit 12 calculates a coordinate value in a virtual three-dimensional coordinate space, the coordinate value indicating a position of a spot on which the applied laser light L_I is reflected. Points corresponding to individual coordinate values are arranged in such a three-dimensional coordinate space, and thereby a three-dimensional model (that is, a pipe model PM) composed of a point group is generated. Note that, when the laser measurement device 1 is of a mobile type or of a portable type, the position data included in the acquired measured data are also used for the calculation of the individual coordinate values.

Besides, a variety of well-known technologies can be used for generating the three-dimensional model that is based on the result of the measurement using the LiDAR. Detailed descriptions of these technologies will be omitted.

The pipe model PM is composed of a plurality of points. The acquired detected data indicates a result of the coherent detection for each of the X-polarization component and the Y-polarization component with regard to the reflected laser light L_R associated with the individual point. Accordingly, by using the acquired detected data, the polarization state detecting unit 13 detects a polarization state in the pipe model PM. More specifically, the polarization state detecting unit 13 detects a polarization state of the reflected laser light associated with the individual point in the pipe model PM, and generates information (hereinafter referred to as "polarization information") indicating that polarization state. For example, for the individual point, the polarization information includes values (hereinafter referred to as "polarization values") PV_X, PV_Y indicating the polarization state of the reflected laser light.

Herein, the polarization value PV_X is a value relating to a magnitude of the X-polarization component. Meanwhile, the polarization value PV_Y is a value relating to a magnitude of the Y-polarization component. For the polarization values PV_X, PV_Y, a variety of values may be used as long as being values relating to such magnitudes. Specific examples of the polarization values PV_X, PV_Y will be described later with reference to FIGS. 4A, 4B, 5A and 5B.

The liquid leak detecting unit 14 detects a liquid leak (for example, an oil leak) in the portion in the pipe P, which is included in the measurement target region, by using the polarization information generated by the polarization state detecting unit 13 (that is, based on the polarization state detected by the polarization state detecting unit 13). More specifically, first, by the liquid leak presence determining unit 21, the presence of the occurrence of the liquid leak in such a portion is determined. When the occurrence of the liquid leak is determined to be present, then, by the liquid leak location detecting unit 22, a position (hereinafter, may be referred to as an "occurrence location") of a portion in the pipe P, in which the liquid leak occurs, is detected. A specific example of a determination method by the liquid leak presence determining unit 21 and a specific example of a detection method by the liquid leak location detecting unit 22 will be described later with reference to FIGS. 6A to 6C and 7A to 7C.

The output control unit 15 executes control for outputting information (hereinafter referred to as "liquid leak information") indicating a result of the detection by the liquid leak detecting unit 14. The output device 3 is used for the output of the liquid leak information. More specifically, the output control unit 15 executes control for displaying an image I including the liquid leak information. The image I may be one including the pipe model PM generated by the pipe model generating unit 12. The display device 31 is used for the display of the image I. Herein, the display device 31 is one using a display. Specifically, for example, the display device 31 is one using a liquid crystal display or an organic electro luminescence (EL) display. A specific example of the image I will be described later with reference to FIGS. 8 and 9.

Thus, the main portion of the liquid leak detection system 100 is constituted.

Hereinafter, the data acquiring unit 11 may be referred to as a "data acquiring means". The pipe model generating unit 12 may be referred to as a "pipe model generating means". The polarization state detecting unit 13 may be referred to as a "polarization state detecting means". The liquid leak detecting unit 14 may be referred to as a "liquid leak detecting means". The output control unit 15 may be referred to as an "output control means". The liquid leak presence determining unit 21 may be referred to as a "liquid leak presence determining means". The liquid leak location detecting unit 22 may be referred to as a "liquid leak location detecting means".

Next, referring to FIGS. 2A, 2B and 2C, a description will be given of a hardware configuration of a main portion of the liquid leak detection device 2.

Figure 2A:
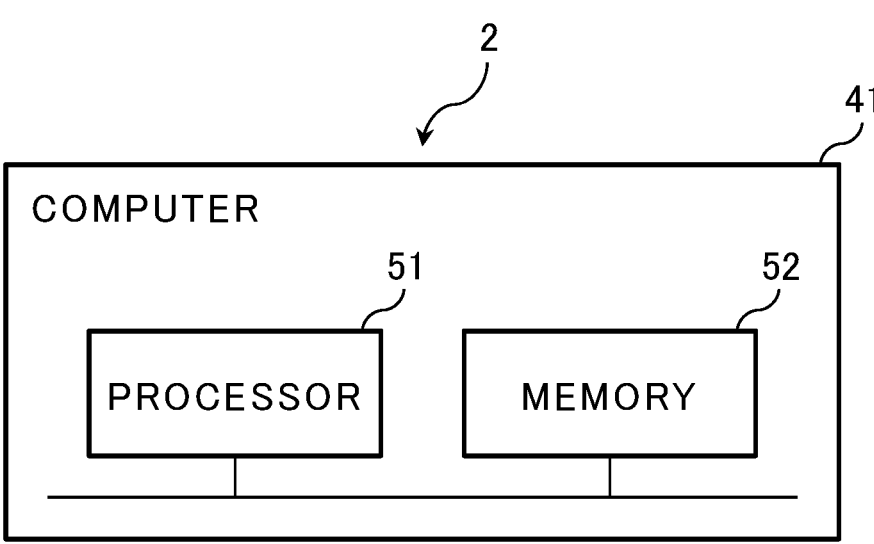
FIG. 2A is a block diagram illustrating a hardware configuration of a main portion of the liquid leak detection device according to the first example embodiment.
Figure 2B:
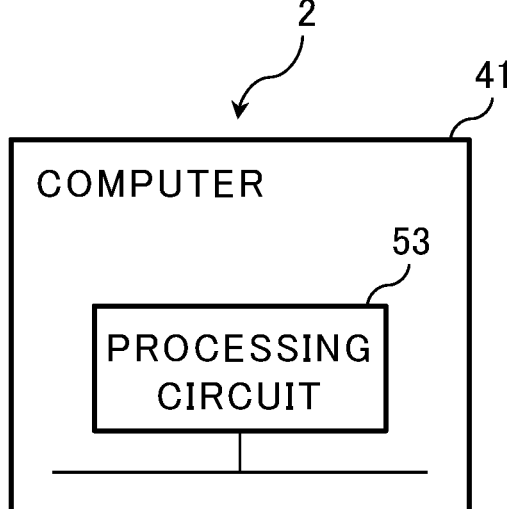
FIG. 2B is a block diagram illustrating another hardware configuration of the main portion of the liquid leak detection device according to the first example embodiment.
Figure 2C:
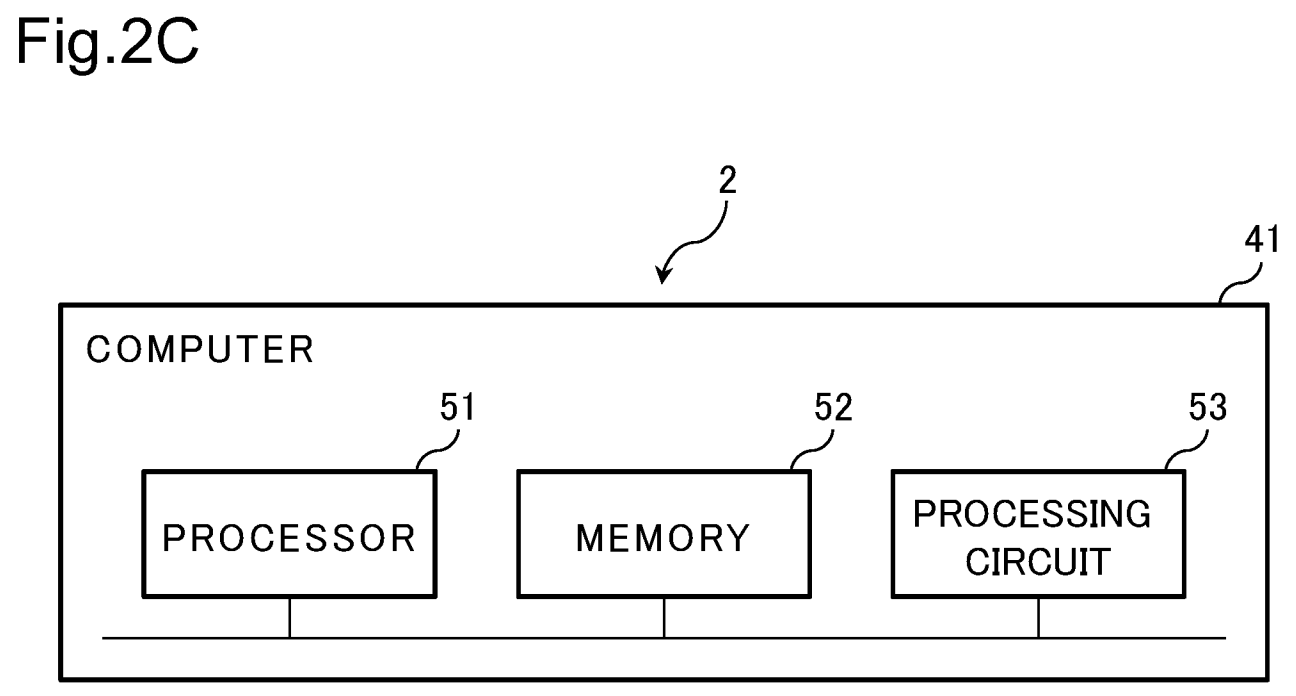

As illustrated in each of FIGS. 2A, 2B and 2C, the liquid leak detection device 2 is one using a computer 41. The computer 41 may be one provided at the same place as a place (for example, a factory) in which the laser measurement device 1 is installed. Alternatively, the computer 41 may be one provided at a different place from the place in which the laser measurement device 1 is installed. For example, the computer 41 may be one provided in a cloud network.

As illustrated in FIG. 2A, the computer 41 includes a processor 51 and a memory 52. In the memory 52, a program for causing the computer 41 to function as the data acquiring unit 11, the pipe model generating unit 12, the polarization state detecting unit 13, the liquid leak detecting unit 14 and the output control unit 15 is stored. The processor 51 reads out and executes the program stored in the memory 52. Thus, a function F1 of the data acquiring unit 11, a function F2 of the pipe model generating unit 12, a function F3 of the polarization state detecting unit 13, a function F4 of the liquid leak detecting unit 14 and a function F5 of the output control unit 15 are achieved.

Alternatively, as illustrated in FIG. 2B, the computer 41 includes a processing circuit 53. The processing circuit 53 executes processing corresponding to the functions F1 to F5. Thus, the functions F1 to F5 are achieved.

Alternatively, as illustrated in FIG. 2C, the computer 41 includes the processor 51, the memory 52 and the processing circuit 53. In the memory 52, a program corresponding to a partial function of the functions F1 to F5 is stored. The processor 51 reads out and executes the program stored in the memory 52. Thus, such a partial function is achieved. Further, the processing circuit 53 executes processing corresponding to a residual function in the functions F1 to F5. Thus, such a residual function is achieved.

The processor 51 is composed of one or more processors. For example, the individual processors are those each using a central processing unit (CPU), a graphics processing unit (GPU), a microprocessor, a microcontroller or a digital signal processor (DSP).

The memory 52 is composed of one or more memories. For example, the individual memories are those each using a random access memory (RAM), a read only memory (ROM), a flash memory, an erasable programmable read only memory (EPROM), an electrically erasable programmable read only memory (EEPROM), a solid state drive, a hard disk drive, a flexible disk, a compact disc, a digital versatile disc (DVD), a Blu-ray disc, a magneto optical (MO) disk or a minidisc.

The processing circuit 53 is composed of one or more processing circuits. For example, the individual processing circuits are those each using an application specific integrated circuit (ASIC), a programmable logic device (PLD), a field programmable gate array (FPGA), a system on a chip (SoC) or a system large scale integration (LSI).

Note that, the processor 51 may be one including a dedicated processor associated with each of the functions F1 to F5. The memory 52 may be one including a dedicated memory associated with each of the functions F1 to F5. The processing circuit 53 may be one including a dedicated processing circuit associated with each of the functions F1 to F5.

Figure 3:
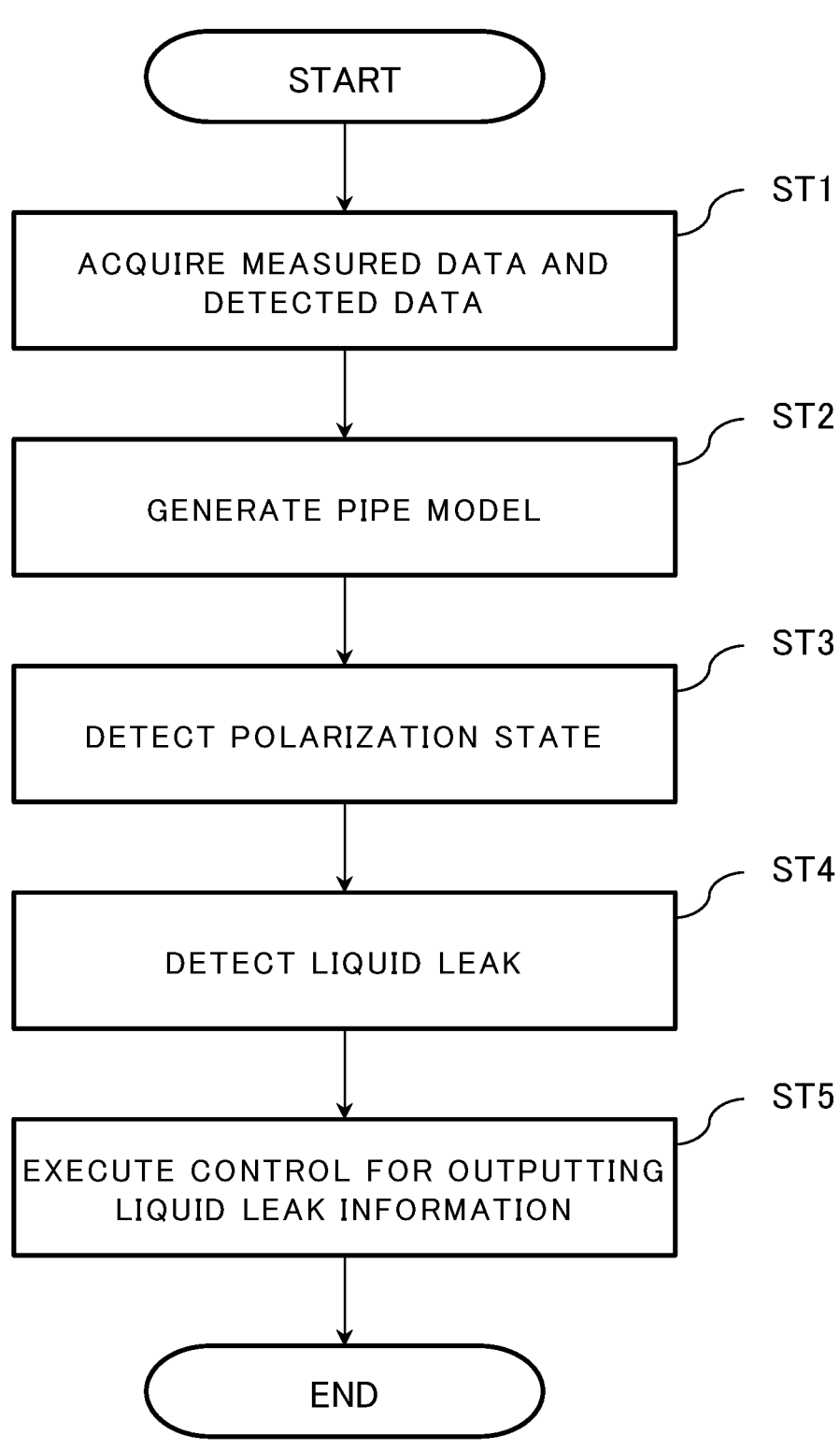
FIG. 3 is a flowchart illustrating an operation of the liquid leak detection device according to the first example embodiment.

Next, referring to a flowchart illustrated in FIG. 3, a description will be given of an operation of the liquid leak detection device 2. First, the data acquiring unit 11 acquires the measured data and the detected data, which are output by the laser measurement device 1 (Step ST1). Subsequently, the pipe model generating unit 12 generates the pipe model PM by using the acquired measured data (Step ST2). Subsequently, the polarization state detecting unit 13 detects the polarization state in the above-described generated pipe model PM by using the acquired detected data (Step ST3). Thus, the polarization information is generated. The polarization information indicates the polarization state of the reflected laser light L_R associated with the individual point in the above-described generated pipe model PM. Subsequently, the liquid leak detecting unit 14 detects the liquid leak in the pipe P by using the polarization information thus generated (Step ST4). Subsequently, the output control unit 15 executes the control for outputting the liquid leak information (Step ST5).

Next, referring to FIGS. 4A, 4B, 5A and 5B, specific examples of the polarization values PV_X, PV_Y will be described.

Figure 4A:
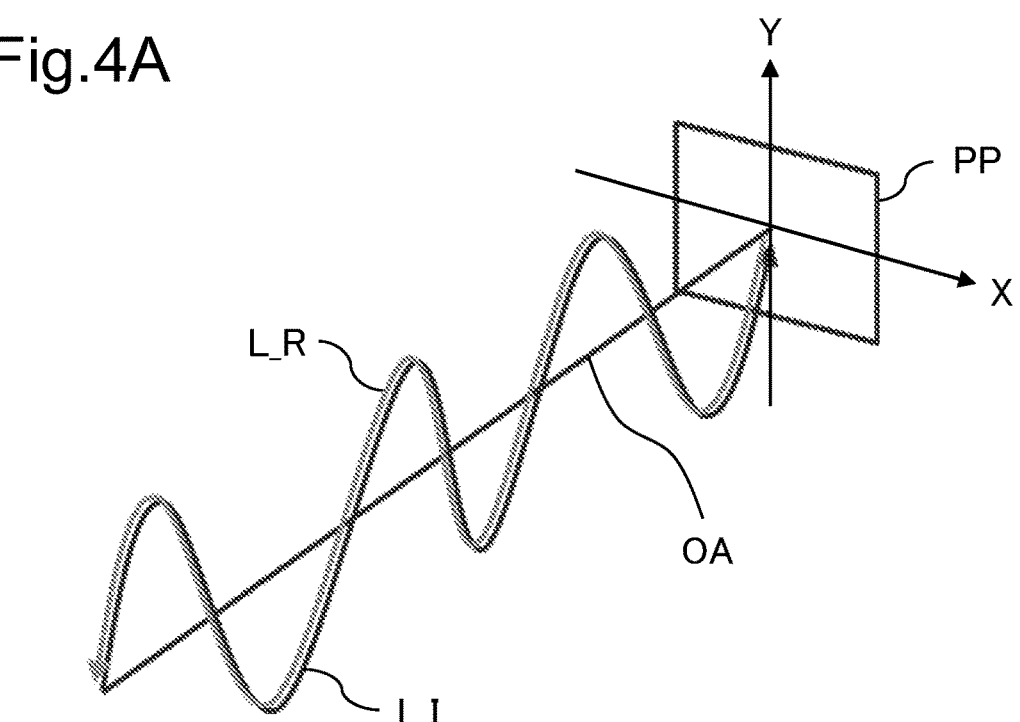
FIG. 4A is an explanatory diagram illustrating an example of a polarization state of laser light relating to a portion in which a liquid leak does not occur in a pipe.

FIG. 4A illustrates an example of the polarization state of the applied laser light L_I and an example of the polarization state of the reflected laser light L_R in a portion of the pipe P, in which the liquid leak does not occur. In the drawing, reference symbol OA denotes an optical axis of the laser light L_I, L_R. Reference symbol PP denotes a virtual plane (hereinafter referred to as a "projected plane") onto which the laser light L_I, L_R is projected. The projected plane PP is orthogonal to the optical axis OA. In the example illustrated in FIG. 4A, the applied laser light L_I does not include the X-polarization component. In other words, the applied laser light L_I includes only the Y-polarization component between the X-polarization component and the Y-polarization component.

Figure 4B:
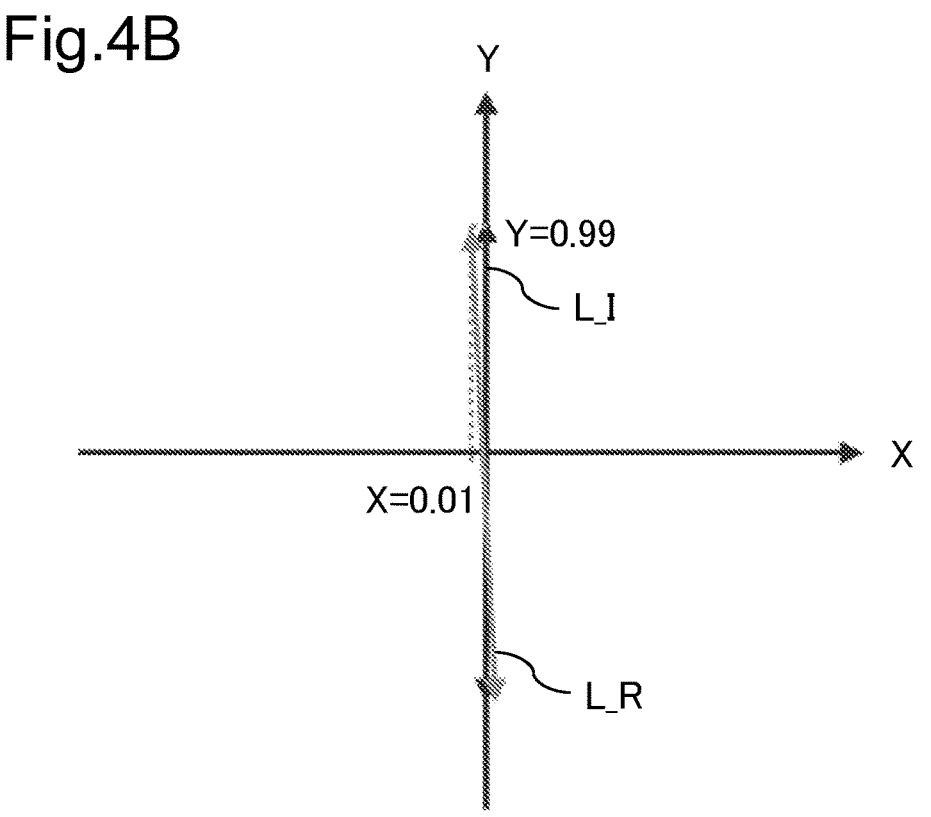
FIG. 4B is an explanatory diagram illustrating an example of a polarization value in the polarization state illustrated in FIG. 4A.

FIG. 4B illustrates an example of a state in which the laser light L_I, L_R illustrated in FIG. 4A is projected onto the projected plane PP. In the example illustrated in FIG. 4B, a value indicating the X-polarization component of the reflected laser light L_R is 0.01, and a value indicating the Y-polarization component of the reflected laser light L_R is 0.99. These values are values normalized by taking an amplitude of the applied laser light L_I as a reference. In this case, for example, such a value of "0.01" is used for the polarization value PV_X, and such a value of "0.99" is used for the polarization value PV_Y.

Figure 5A:
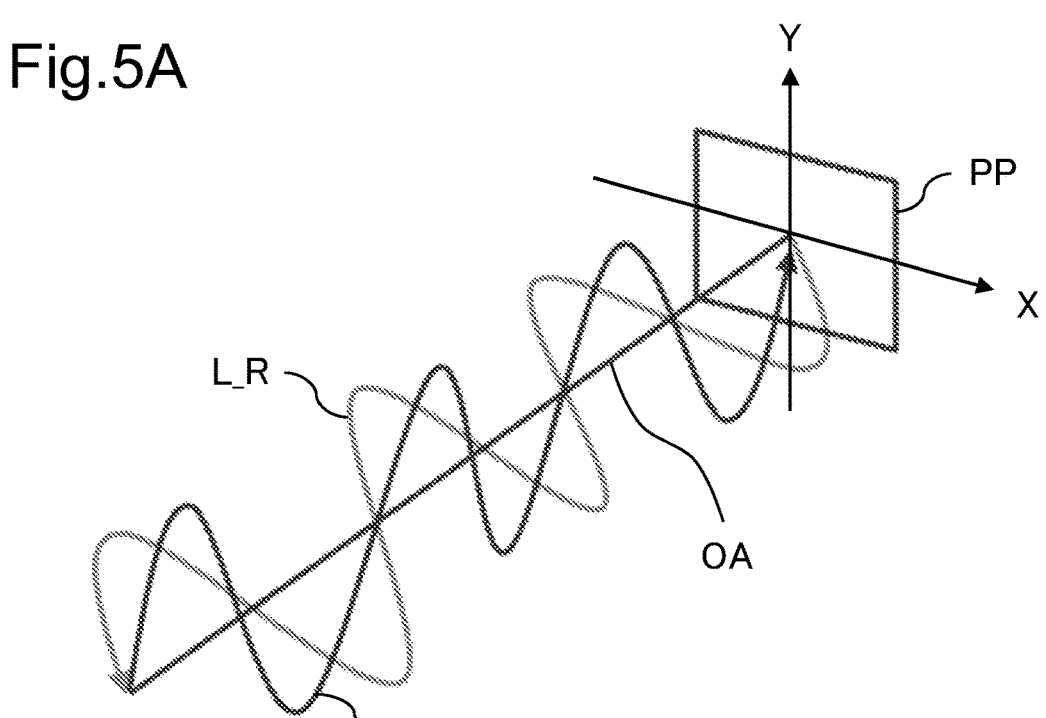
FIG. 5A is an explanatory diagram illustrating an example of a polarization state of laser light relating to a portion in which the liquid leak occurs in the pipe.
Figure 5B:
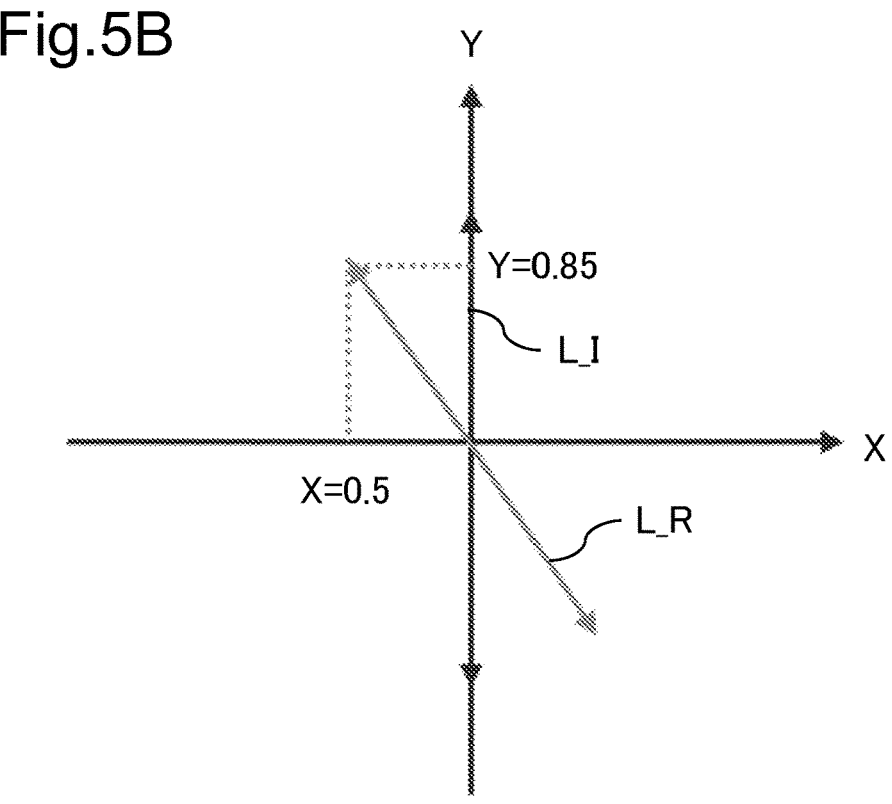
FIG. 5B is an explanatory diagram illustrating an example of a polarization value in the polarization state illustrated in FIG. 5A.

FIG. 5A illustrates an example of the polarization state of the applied laser light L_I and an example of the polarization state of the reflected laser light L_R in a portion of the pipe P, in which the liquid leak occurs. FIG. 5B illustrates an example of a state in which the laser light L_I, L_R illustrated in FIG. 5A is projected onto the projected plane PP. In the example illustrated in FIG. 5B, the value indicating the X-polarization component of the reflected laser light L_R is 0.5, and the value indicating the Y-polarization component of the reflected laser light L_R is 0.85. These values are values normalized by taking the amplitude of the applied laser light L_I as a reference. In this case, for example, such a value of "0.5" is used for the polarization value PV_X, and such a value of "0.85" is used for the polarization value PV_Y.

As described above, the polarization state (refer to FIG. 5A) of the reflected laser light L_R in the portion in which the liquid leak occurs becomes different from the polarization state (refer to FIG. 4A) of the reflected laser light L_R in the portion in which the liquid leak does not occur. Therefore, the polarization value (refer to FIG. 5B) associated with the portion in which the liquid leak occurs becomes different from the polarization value (refer to FIG. 4B) associated with the portion in which the liquid leak does not occur. This is due to the fact that a physical property (particularly an optical property) of the leaked liquid is different from a physical property (particularly an optical property) of a material of a surface portion of the pipe P.

Next, referring to FIGS. 6A to 6C and 7A to 7C, the specific example of the determination method by the liquid leak presence determining unit 21 will be described. Further, a specific example of a detection method by the liquid leak location detecting unit 22 will be described.

First, on a virtual two-dimensional map M, the liquid leak detecting unit 14 plots the individual polarization values PV_X, PV_Y included in the polarization information generated by the polarization state detecting unit 13. Herein, the two-dimensional map M has a first axis corresponding to the X-polarization component, and a second axis corresponding to the Y-polarization component (refer to FIGS. 6C and 7C).

Subsequently, the liquid leak detecting unit 14 executes clustering for the plotted polarization values PV_X, PV_Y. Thus, one or more groups G are set.

Figure 6A:
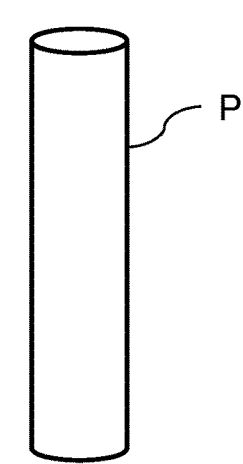
FIG. 6A is an explanatory diagram illustrating an example of the pipe in a state in which the liquid leak does not occur.
Figure 6B:
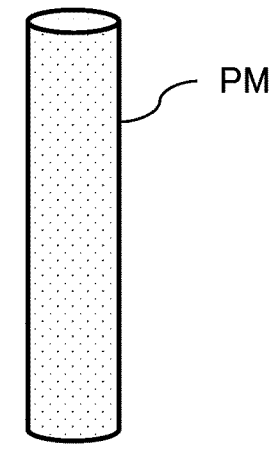
FIG. 6B is an explanatory diagram illustrating an example of a pipe model in such a state in which the liquid leak does not occur.
Figure 6C:
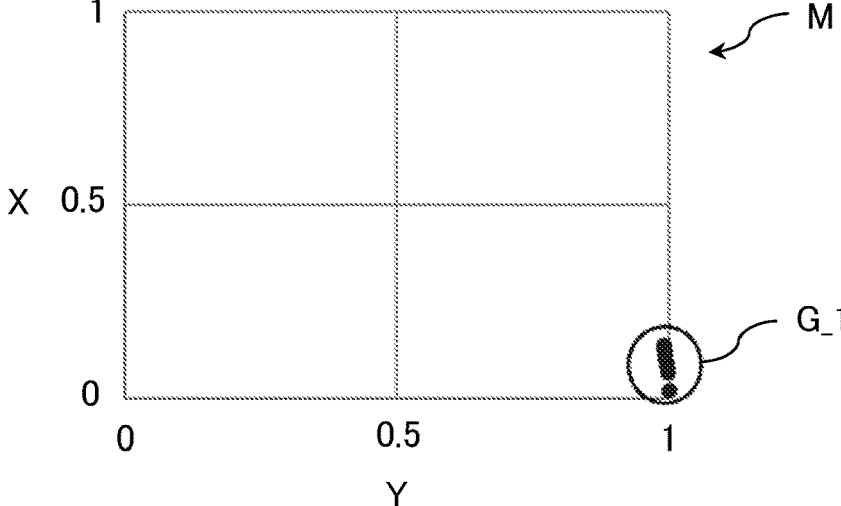
FIG. 6C is an explanatory diagram illustrating an example of a two-dimensional map in which individual polarization values in a state in which the liquid leak does not occur are plotted.

Herein, FIG. 6A illustrates an example of the pipe P in a state in which the liquid leak does not occur. FIG. 6B illustrates an example of the pipe model PM in such a state in which the liquid leak does not occur. FIG. 6C illustrates an example of a state in which the individual polarization values PV_X, PV_Y are plotted on the two-dimensional map M in the state in which the liquid leak does not occur.

Figure 7A:
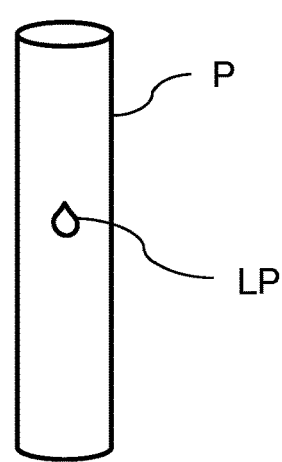
FIG. 7A is an explanatory diagram illustrating an example of the pipe in a state in which the liquid leak occurs.
Figure 7B:
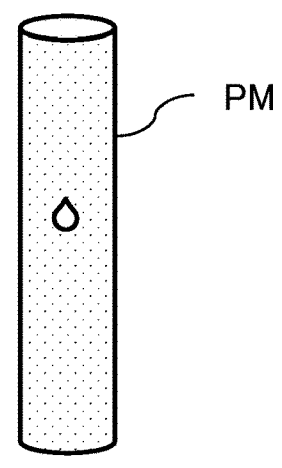
FIG. 7B is an explanatory diagram illustrating an example of a pipe model in a state in which the liquid leak occurs.
Figure 7C:
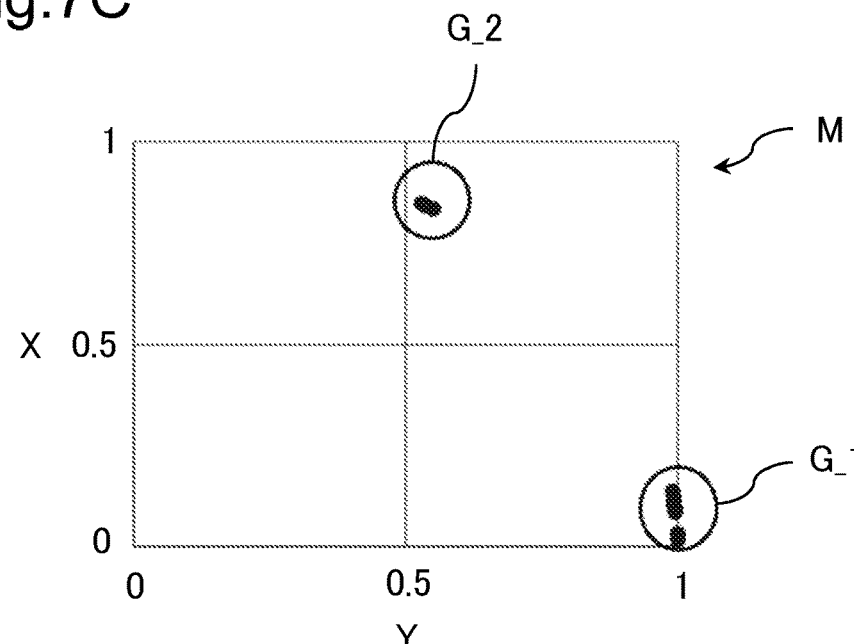
FIG. 7C is an explanatory diagram illustrating an example of a two-dimensional map in which individual polarization values in a state in which the liquid leak occurs are plotted.

Meanwhile, FIG. 7A illustrates an example of the pipe P in a state in which the liquid leak occurs. In the drawing, reference symbol LP denotes the occurrence location of the liquid leak in the pipe P. FIG. 7B illustrates an example of the pipe model PM in such a state in which the liquid leak occurs. FIG. 7C illustrates an example of a state in which the individual polarization values PV_X, PV_Y are plotted on the two-dimensional map M in the state in which the liquid leak occurs.

In the state in which the liquid leak does not occur, all of the polarization values PV_X, PV_Y in the plurality of polarization values PV_X, PV_Y included in the polarization information take equivalent values to values illustrated in FIG. 4B. Therefore, one group G_1 is set by the clustering (refer to FIG. 6C).

Meanwhile, in the state in which the liquid leak occurs, a part of the polarization values PV_X, PV_Y in the plurality of polarization values PV_X, PV_Y included in the polarization information takes the equivalent values to the values illustrated in FIG. 4B. Further, the residual polarization values PV_X, PV_Y in the plurality of polarization values PV_X, PV_Y included in the polarization information take equivalent values to values illustrated in FIG. 5B. Therefore, two groups G_1, G_2 are set by the clustering (refer to FIG. 7C). However, while FIG. 5B illustrates an example of the case of PV_X=0.5 and PV_Y=0.85, FIG. 7C illustrates an example of the case of PV_X≈0.85 and PV_Y≈0.5.

Accordingly, when one group G_1 is set by the clustering, the liquid leak presence determining unit 21 determines that the liquid leak does not occur. Meanwhile, when two or more groups are set by the clustering, the liquid leak presence determining unit 21 determines that the liquid leak occurs.

Further, usually, an area of the portion in the surface portion of the pipe P, in which the liquid leak occurs, is small in comparison with an area of the portion in the surface portion of the pipe P, in which the liquid leak does not occur. Therefore, the number of polarization values PV_X, PV_Y included in the group associated with the portion in which the liquid leak occurs is small in comparison with the number of polarization values PV_X, PV_Y included in the group associated with the portion in which the liquid leak does not occur. For example, in the example illustrated in FIG. 7C, the number of polarization values PV_X, PV_Y included in the group G_2 is small in comparison with the number of polarization values PV_X, PV_Y included in the group G_1.

Accordingly, based on the number of polarization values PV_X, PV_Y included in each of the individual groups, the liquid leak location detecting unit 22 determines whether, in each of the individual groups, the polarization values PV_X, PV_Y are associated with the portion in which the liquid leak occurs or associated with the portion in which the liquid leak does not occur. For the polarization values PV_X, PV_Y included in the group associated with the portion in which the liquid leak occurs, the liquid leak location detecting unit 22 identifies a point corresponding thereto in the pipe model PM. Thus, the occurrence location of the liquid leak in the pipe P is detected.

Note that, the polarization values PV_X, PV_Y in the portion in which the liquid leak does not occur are not limited to those in the example illustrated in FIGS. 4A and 4B. That is, the value of PV_X in such a portion is not limited to approximately 0 (for example, 0.01). Further, the value of PV_Y in such a portion is not limited to approximately 1 (for example, 0.99). The polarization values PV_X, PV_Y in such a portion differ depending on the physical property (particularly the optical property) or the like of the material of the surface portion of the pipe P.

Next, referring to FIGS. 8 and 9, the specific example of the image I displayed on the display device 31 will be described.

Figure 8:
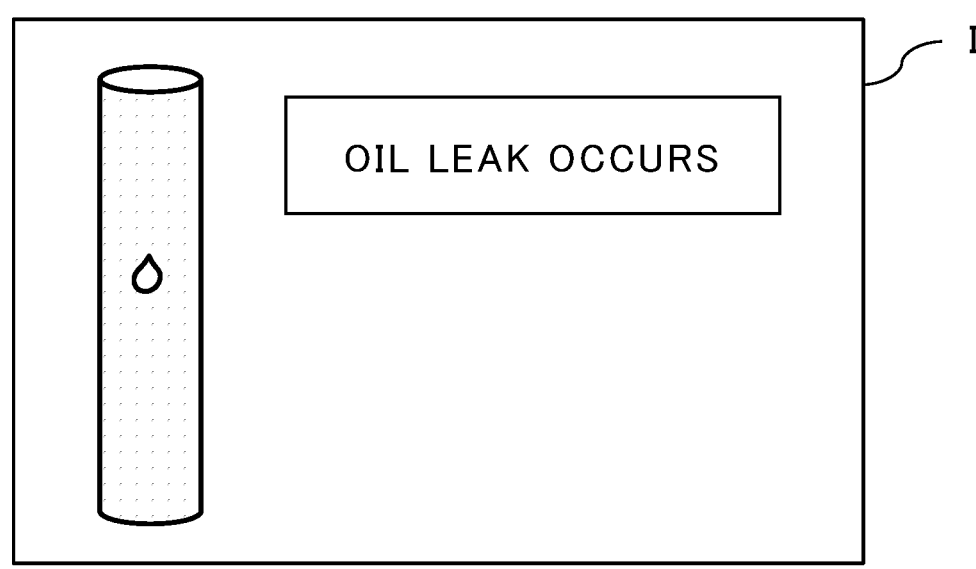
FIG. 8 is an explanatory diagram illustrating an example of an image displayed on a display device.
Figure 9:
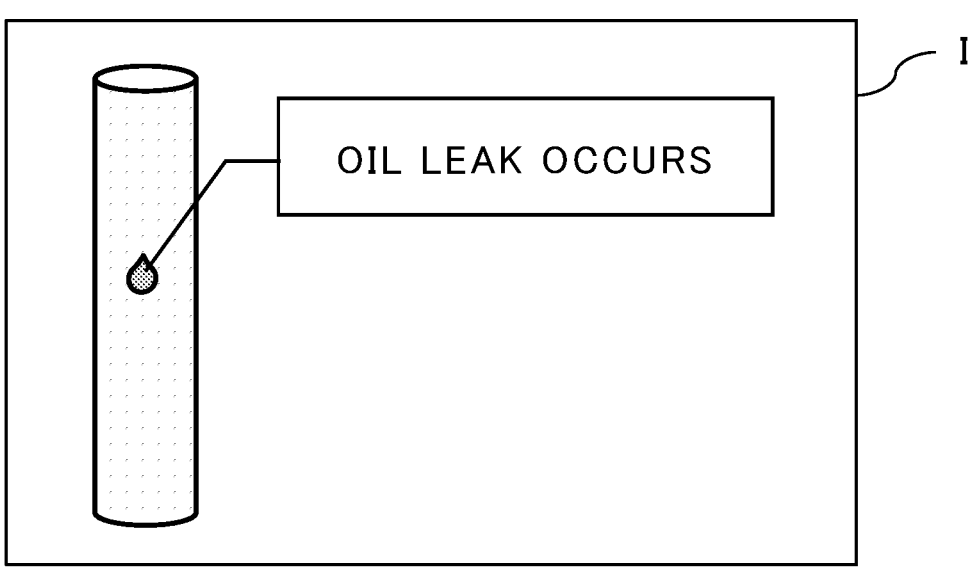
FIG. 9 is an explanatory diagram illustrating an example of another image displayed on the display device.

Each of FIGS. 8 and 9 illustrates an example of the image I when it is determined by the liquid leak presence determining unit 21 that the liquid leak occurs. As illustrated in each of FIGS. 8 and 9, the image I may be one including a text-like image ("Oil leak occurs" in the drawing) indicating that the liquid leak occurs. Thus, a user (for example, each of operations personnel in the factory having the pipe P) of the liquid leak detection system 100 can be informed that the liquid leak has occurred. In addition to this, the image I may be one including the pipe model PM. Thus, the user of the liquid leak detection system 100 can confirm the surface shape of the pipe P including the portion in which the liquid leak occurs.

Herein, as illustrated in FIG. 9, the image I may be one indicating the occurrence location of the liquid leak detected by the liquid leak location detecting unit 22. In the example illustrated in FIG. 9, the portion of the pipe model PM, which corresponds to the occurrence location of the liquid leak, is displayed by a color different from a color of the other portion. Thus, the user of the liquid leak detection system 100 can be informed of the occurrence location of the liquid leak.

Next, effects by using the liquid leak detection system 100 will be described.

In the technique described in PTL 1, at the time of detecting the oil leak in the pipe, required are work for installing a light irradiation means and a visible light camera. Further, required is control for synchronizing timing when the light is applied by the light irradiation means and timing when the image is captured by the visible light camera with each other. That is, the control for synchronizing two types of devices with each other is required in addition to that the work for installing the two types of devices is required. Therefore, there is a problem that the configuration is complicated.

In contrast, in the liquid leak detection system 100, the laser measurement device 1 is installed (that is, one type of device is installed), and thereby the liquid leak in the pipe P can be detected. Further, need of such control as described above for synchronizing two types of devices with each other can be eliminated. As a result, the liquid leak in the pipe P can be detected more easily.

At this time, the polarization information (more specifically, the polarization values PV_X, PV_Y) associated with the individual points in the pipe model PM is used, thereby it can be determined whether the liquid leak occurs, and further the occurrence location of the liquid leak can be detected. As a result, the user of the liquid leak detection system 100 can be informed of the occurrence location of the liquid leak.

Next, a modified example of the liquid leak detection system 100 will be described.

The polarization values PV_X, PV_Y are not limited to the above-described specific example. That is, the polarization values PV_X, PV_Y are not limited to the values normalized by taking the applied laser light L_I as a reference. The polarization value PV_X needs only to be a value associated with the X-polarization component of the reflected laser light L_R. Meanwhile, the polarization value PV_Y needs only to be a value associated with the Y-polarization component of the reflected laser light L_R. For example, the polarization values PV_X, PV_Y may be those using the Jones vector. In such a case, the laser measurement device 1 may be one detecting a phase difference in the X-polarization component and the Y-polarization component. A variety of well-known technologies can be used for the detection of the phase difference by using the LiDAR. Detailed descriptions of these technologies will be omitted.

Next, another modified example of the liquid leak detection system 100 will be described.

The liquid leak detecting unit 14 may be one comparing the individual polarization values PV_X, PV_Y with reference values in place of executing the clustering as described above. Herein, the reference values are values equivalent to the polarization values PV_X, PV_Y in the portion in which the liquid leak does not occur. The reference values are values which differ depending on the physical property (particularly the optical property) or the like of the material of the surface portion of the pipe P. The reference values are preset in the liquid leak detecting unit 14.

In such a case, for example, the liquid leak detecting unit 14 calculates distances between the reference values and the individual polarization values PV_X, PV_Y in the two-dimensional map M. The liquid leak detecting unit 14 compares the calculated distances with predetermined threshold values, thereby determining whether the individual polarization values PV_X, PV_Y are associated with the portion in which the liquid leak occurs or associated with the portion in which the liquid leak does not occur. Based on a result of such a determination, the liquid leak presence determining unit 21 determines whether the liquid leak occurs, and the liquid leak location detecting unit 22 detects the occurrence location of the liquid leak.

However, in such a case, at the time of detecting the liquid leak in the pipe P, it is required that such reference values be set in advance. When it is impossible or difficult to set such reference values in advance (for example, when the physical property of material on the surface portion of the pipe P is unknown), it is suitable to use the clustering.

Next, another modified example of the liquid leak detection system 100 will be described.

The liquid leak detecting unit 14 may be one that does not have the liquid leak location detecting unit 22. In other words, the liquid leak detecting unit 14 may be one having only the liquid leak presence determining unit 21 between the liquid leak presence determining unit 21 and the liquid leak location detecting unit 22.

Next, another modified example of the liquid leak detection system 100 will be described.

The output device 3 is not limited to the display device 31. For example, the output device 3 may be one including a voice output device (not illustrated) in place of or in addition to the display device 31. For example, the voice output device is one using a speaker.

In such a case, the output control unit 15 may be one executing control for outputting a voice, which includes the liquid leak information, in place of or in addition to the control for displaying the image I including the liquid leak information. For such output of the voice, the voice output device is used.

Next, another modified example of the liquid leak detection system 100 will be described.

The output control unit 15 may be one executing the control for outputting the liquid leak information regardless of the result of the determination by the liquid leak presence determining unit 21. That is, when it is determined that the liquid leak occurs, for example, the image I (refer to FIG. 8 or 9) illustrating the occurrence of the liquid leak is displayed. Meanwhile, when it is determined that the liquid leak does not occur, for example, such an image I (not illustrated) illustrating the non-occurrence of the liquid leak is displayed.

Alternatively, the output control unit 15 may be one executing the control for outputting the liquid leak information only when it is determined that the liquid leak occurs. In other words, the output control unit 15 may be one cancelling the execution of such control when it is determined that the liquid leak does not occur.

Next, referring to FIG. 10, another modified example of the liquid leak detection system 100 will be described.

Figure 10:
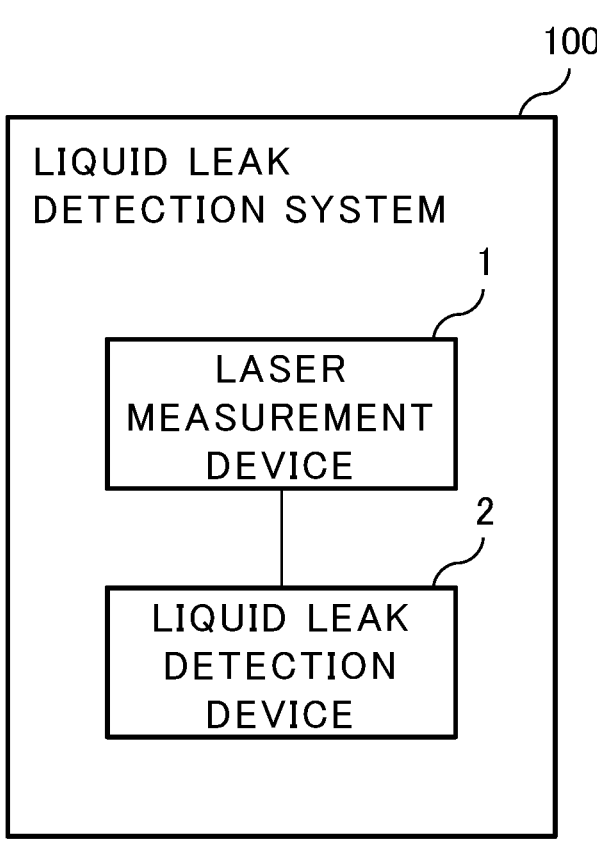
FIG. 10 is a block diagram illustrating a main portion of another liquid leak detection system according to the first example embodiment.

As illustrated in FIG. 10, the main portion of the liquid leak detection system 100 may be composed of the laser measurement device 1 and the liquid leak detection device 2. In such a case, the output device 3 may be one provided outside the liquid leak detection system 100.

Next, referring to FIG. 11, a modified example of the liquid leak detection device 2 will be described.

Figure 11:
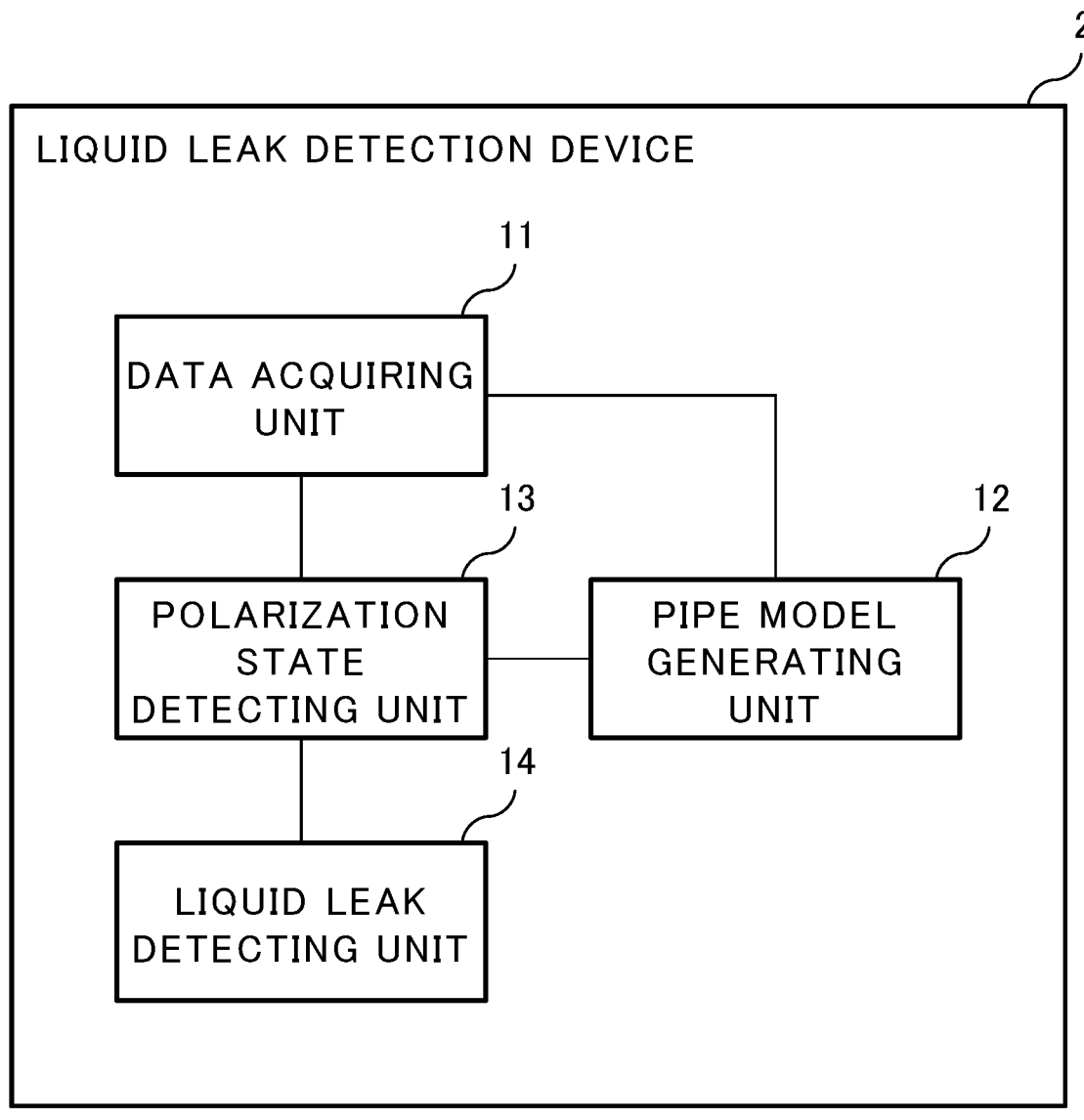
FIG. 11 is a block diagram illustrating a main portion of another liquid leak detection device according to the first example embodiment.

As illustrated in FIG. 11, the liquid leak detection device 2 may be one in which the main portion is composed of the data acquiring unit 11, the pipe model generating unit 12, the polarization state detecting unit 13 and the liquid leak detecting unit 14. In such a case, the output control unit 15 may be one provided in the output device 3. Even in such a case, such effects as described above can be exerted.

That is, the data acquiring unit 11 acquires data (more specifically, the measured data and the detected data) based on reflected light of the laser light applied to the region including the pipe P. The pipe model generating unit 12 generates the pipe model PM that is the three-dimensional model of the pipe P by using the data (more specifically, the measured data). The polarization state detecting unit 13 detects the polarization state in the pipe model PM by using the data (more specifically, the detected data). The liquid leak detecting unit 14 detects the liquid leak in the pipe P, based on the polarization state detected by the polarization state detecting unit 13. As described above, in the liquid leak detection device 2, the data based on the reflected light of the laser light is used (that is, data acquired by using the laser measurement device 1 is used), and thereby the liquid leak in the pipe P can be detected. That is, similarly to the technique described in PTL 1, the control for synchronizing two types of devices with each other can be eliminated. Thus, the liquid leak in the pipe P can be detected more easily.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Some or all of the above-described example embodiments can also be described as in the following Supplementary notes, however, are not limited to the following.

[Supplementary Note]

[Supplementary Note 1]

A liquid leak detection device including:

a data acquiring means for acquiring data based on reflected light of laser light applied to a region including a pipe;

a pipe model generating means for generating a pipe model being a three-dimensional model of the pipe by using the data;

a polarization state detecting means for detecting a polarization state in the pipe model by using the data; and a liquid leak detecting means for detecting a liquid leak in the pipe, based on the polarization state detected by the polarization state detecting means.

[Supplementary Note 2]

The liquid leak detection device according to Supplementary note 1, wherein the polarization state detecting means detects a polarization value indicating the polarization state in the pipe model.

[Supplementary Note 3]

The liquid leak detection device according to Supplementary note 2, wherein the data includes detected data indicating a result of coherent detection for the reflected light, and the polarization state detecting means detects the polarization value by using the detected data.

[Supplementary Note 4]

The liquid leak detection device according to Supplementary note 2 or 3, wherein the polarization value is one using a Jones vector.

[Supplementary Note 5]

The liquid leak detection device according to any one of Supplementary notes 2 to 4, wherein the liquid leak detecting means detects the liquid leak by executing clustering for the polarization value.

[Supplementary Note 6]

The liquid leak detection device according to any one of Supplementary notes 2 to 4, wherein the liquid leak detecting means detects the liquid leak by comparing the polarization value with a reference value.

[Supplementary Note 7]

The liquid leak detection device according to any one of Supplementary notes 1 to 6, wherein the liquid leak detecting means includes a liquid leak presence determining means for determining whether the liquid leak occurs.

[Supplementary Note 8]

The liquid leak detection device according to any one of Supplementary notes 1 to 6, wherein the liquid leak detecting means includes a liquid leak presence determining means for determining whether the liquid leak occurs, and a liquid leak location detecting means for detecting an occurrence location of the liquid leak in the pipe.

[Supplementary Note 9]

The liquid leak detection device according to any one of Supplementary notes 1 to 8, further including an output control means for executing control for outputting liquid leak information indicating a result of detection by the liquid leak detecting means.

[Supplementary Note 10]

The liquid leak detection device according to Supplementary note 9, wherein the output control means executes the control for displaying an image including the pipe model and the liquid leak information.

[Supplementary Note 11]

A liquid leak detection system including:

the liquid leak detection device according to any one of Supplementary notes 1 to 10; and a laser measurement device that emits the laser light and receives the reflected light.

[Supplementary Note 12]

A liquid leak detection method including:

acquiring, by a data acquiring means, data based on reflected light of laser light applied to a region including a pipe;

generating, by a pipe model generating means, a pipe model being a three-dimensional model of the pipe by using the data;

detecting, by a polarization state detecting means, a polarization state in the pipe model by using the data; and detecting, by a liquid leak detecting means, a liquid leak in the pipe, based on the polarization state detected by the polarization state detecting means.

[Supplementary Note 13]

The liquid leak detection method according to Supplementary note 12, wherein the polarization state detecting means detects a polarization value indicating the polarization state in the pipe model.

[Supplementary Note 14]

The liquid leak detection method according to Supplementary note 13, wherein the data includes detected data indicating a result of coherent detection for the reflected light, and the polarization state detecting means detects the polarization value by using the detected data.

[Supplementary Note 15]

The liquid leak detection method according to Supplementary note 13 or 14, wherein the polarization value is one using a Jones vector.

[Supplementary Note 16]

The liquid leak detection method according to any one of Supplementary notes 13 to 15, wherein the liquid leak detecting means detects the liquid leak by executing clustering for the polarization value.

[Supplementary Note 17]

The liquid leak detection method according to any one of Supplementary notes 13 to 15, wherein the liquid leak detecting means detects the liquid leak by comparing the polarization value with a reference value.

[Supplementary Note 18]

The liquid leak detection method according to any one of Supplementary notes 12 to 17, wherein the liquid leak detecting means determines whether the liquid leak occurs.

[Supplementary Note 19]

The liquid leak detection method according to any one of Supplementary notes 12 to 17, wherein the liquid leak detecting means determines whether the liquid leak occurs and further detects an occurrence location of the liquid leak in the pipe.

[Supplementary Note 20]

The liquid leak detection method according to any one of Supplementary notes 12 to 19, wherein an output control means executes control for outputting liquid leak information indicating a result of detection by the liquid leak detecting means.

[Supplementary Note 21]

The liquid leak detection method according to Supplementary note 20, wherein the output control means executes the control for displaying an image including the pipe model and the liquid leak information.

[Supplementary Note 22]

A recording medium recording a program for causing a computer to function as:

a data acquiring means for acquiring data based on reflected light of laser light applied to a region including a pipe;

a pipe model generating means for generating a pipe model being a three-dimensional model of the pipe by using the data;

a polarization state detecting means for detecting a polarization state in the pipe model by using the data; and a liquid leak detecting means for detecting a liquid leak in the pipe, based on the polarization state detected by the polarization state detecting means.

[Supplementary Note 23]

The recording medium according to Supplementary note 22, wherein the polarization state detecting means detects a polarization value indicating the polarization state in the pipe model.

[Supplementary Note 24]

The recording medium according to Supplementary note 23, wherein the data includes detected data indicating a result of coherent detection for the reflected light and the polarization state detecting means detects the polarization value by using the detected data.

[Supplementary Note 25]

The recording medium according to Supplementary note 23 or 24, wherein the polarization value is one using a Jones vector.

[Supplementary Note 26]

The recording medium according to any one of Supplementary notes 23 to 25, wherein the liquid leak detecting means detects the liquid leak by executing clustering for the polarization value.

[Supplementary Note 27]

The recording medium according to any one of Supplementary notes 23 to 25, wherein the liquid leak detecting means detects the liquid leak by comparing the polarization value with a reference value.

[Supplementary Note 28]

The recording medium according to any one of Supplementary notes 22 to 27, wherein the liquid leak detecting means includes a liquid leak presence determining means for determining whether the liquid leak occurs.

[Supplementary Note 29]

The recording medium according to any one of Supplementary notes 22 to 27, wherein the liquid leak detecting means includes a liquid leak presence determining means for determining whether the liquid leak occurs and a liquid leak location detecting means for detecting an occurrence location of the liquid leak in the pipe.

[Supplementary Note 30]

The recording medium according to any one of Supplementary notes 22 to 29, wherein the program is one causing the computer to function as an output control means for executing control for outputting liquid leak information indicating a result of detection by the liquid leak detecting means.

[Supplementary Note 31]

The recording medium according to Supplementary note 30, wherein the output control means executes the control for displaying an image including the pipe model and the liquid leak information.

REFERENCE SIGNS LIST

1 Laser measurement device
2 Liquid leak detection device
3 Output device
11 Data acquiring unit
12 Pipe model generating unit
13 Polarization state detecting unit
14 Liquid leak detecting unit
15 Output control unit
21 Liquid leak presence determining unit
22 Liquid leak location detecting unit
31 Display device
41 Computer
51 Processor
52 Memory
53 Processing circuit
100 Liquid leak detection system

What is claimed is:

1. A liquid leak detection device comprising:
at least one memory configured to store instructions; and
at least one processor configured to execute the instructions to:
acquire data based on reflected light of laser light applied to a region including a pipe from a laser measurement device that emits the laser light and receives the reflected light,
generate a pipe model being a three-dimensional model of a surface shape of the pipe by using the data,
detect a change in polarization state caused by a liquid leak in the pipe model by using the data, detect a portion of a liquid leak in the pipe, based on the polarization state in the pipe model, and
output information indicating the portion of the liquid leak in the pipe to a display device for displaying the information on a display of the display device, wherein
the data includes detected data indicating a result of coherent detection for the reflected light using a polarization splitter that splits the reflected light into X-polarization and Y-polarization components, and
the pipe model is composed of a plurality of points corresponding to coordinate values in a virtual three-dimensional coordinate space.

2. The liquid leak detection device according to claim 1, wherein the at least one processor is configured to execute the instructions to:
detect a polarization value indicating the polarization state in the pipe model.

3. The liquid leak detection device according to claim 2, the at least one processor is configured to execute the instructions to:
detect the polarization value by using the detected data.

4. The liquid leak detection device according to claim 3, wherein the polarization value is one using a Jones vector.

5. The liquid leak detection device according to claim 4, wherein the at least one processor is configured to execute the instructions to:
detect the liquid leak by executing clustering for the polarization value.

6. The liquid leak detection device according to claim 3, wherein the at least one processor is configured to execute the instructions to:
determine whether the liquid leak occurs.

7. The liquid leak detection device according to claim 2, wherein the polarization value is one using a Jones vector.

8. The liquid leak detection device according to claim 7, wherein the at least one processor is configured to execute the instructions to:
detect the liquid leak by executing clustering for the polarization value.

9. The liquid leak detection device according to claim 7, wherein the at least one processor is configured to execute the instructions to:
determine whether the liquid leak occurs.

10. The liquid leak detection device according to claim 2, wherein the at least one processor is configured to execute the instructions to:
detect the liquid leak by executing clustering for the polarization value.

11. The liquid leak detection device according to claim 10, wherein the at least one processor is configured to execute the instructions to:
determine whether the liquid leak occurs.

12. The liquid leak detection device according to claim 2, wherein the at least one processor is configured to execute the instructions to:
detect the liquid leak by comparing the polarization value with a reference value.

13. The liquid leak detection device according to claim 12, wherein the at least one processor is configured to execute the instructions to:
determine whether the liquid leak occurs.

14. The liquid leak detection device according to claim 2, wherein the at least one processor is configured to execute the instructions to:
determine whether the liquid leak occurs.

15. The liquid leak detection device according to claim 1, wherein the at least one processor is configured to execute the instructions to:

determine whether the liquid leak occurs.

16. The liquid leak detection device according to claim 1, wherein the at least one processor is configured to execute the instructions to:

determine whether the liquid leak occurs, and detect an occurrence location of the liquid leak in the pipe.

17. A liquid leak detection system comprising:

the liquid leak detection device according to claim 1, and a laser measurement device that emits the laser light and receives the reflected light.

18. A liquid leak detection method, executed by a computer, comprising:

acquiring data based on reflected light of laser light applied to a region including a pipe from a laser measurement device that emits the laser light and receives the reflected light;

generating a pipe model being a three-dimensional model of a surface shape of the pipe by using the data;

detecting a change in polarization state caused by a liquid leak in the pipe model by using the data; and detecting a portion of a liquid leak in the pipe, based on the polarization state in the pipe model; and outputting information indicating the portion of the liquid leak in the pipe to a display device for displaying the information on a display of the display device, wherein the data includes detected data indicating a result of coherent detection for the reflected light using a polarization splitter that splits the reflected light into X-polarization and Y-polarization components, and the pipe model is composed of a plurality of points corresponding to coordinate values in a virtual three-dimensional coordinate space.

* * * * *